United States Patent
Kose et al.

(10) Patent No.: US 10,618,207 B2
(45) Date of Patent: Apr. 14, 2020

(54) METHOD FOR PRODUCING A MATERIAL COMPOSITE COMPOSED OF METAL AND PLASTIC TO FORM A PLASTIC-METAL HYBRID COMPONENT

(71) Applicants: inpro Innovationsgesellschaft für fortgeschrittene Produktionssysteme in der Fahrzeugindustrie mbH, Berlin (DE); ALBIS PLASTIC GmbH, Hamburg (DE); ALLOD Werkstoff GmbH & Co. KG, Burgbernheim (DE); AUDI AG, Ingolstadt (DE); BASF SE, Ludwigshafen (DE); Neue Materialien Fürth GmbH, Fürth (DE); Sabic Innovative Plastics B.V., Bergen op Zoom (NL); TRUMPF Laser-und Systemtechnik GmbH, Ditzingen (DE); Daimler AG, Stuttgart (DE)

(72) Inventors: Kim Kose, Berlin (DE); Stephan Ohnimus, Berlin (DE); Michael Minkow, Berlin (DE); Harald Ott, Halstenbek (DE); Alexander Näck, Mainstockheim (DE); Jan Gaugler, Hassersheim (DE); Holger Klink, Mühltal (DE); Fred Eggers, Buxtehude (DE); Leo Hoffmann, Fürth (DE); Gerardus Doggen, Kruisland (NL); Birgit Faisst, Stuttgart (DE)

(73) Assignees: BASF SE, Ludwigshafen (DE); Sabic Innovative Plastics B.V., Bergen op Zoom (NL); TRUMPF Laser—und Systemtechnik GmbH, Ditzingen (DE)

(*) Notice: Subject to any disclaimer, the term of this patent is extended or adjusted under 35 U.S.C. 154(b) by 578 days.

(21) Appl. No.: 15/317,986
(22) PCT Filed: May 4, 2015
(86) PCT No.: PCT/DE2015/000217
§ 371 (c)(1),
(2) Date: Dec. 12, 2016

(87) PCT Pub. No.: WO2015/188798
PCT Pub. Date: Dec. 17, 2015

(65) Prior Publication Data
US 2017/0136668 A1 May 18, 2017

(30) Foreign Application Priority Data
Jun. 11, 2014 (DE) .................... 10 2014 008 815

(51) Int. Cl.
*B23K 26/0622* (2014.01)
*B29C 45/14* (2006.01)
(Continued)

(52) U.S. Cl.
CPC .... *B29C 45/14311* (2013.01); *B23K 26/0006* (2013.01); *B23K 26/0624* (2015.10);
(Continued)

(58) Field of Classification Search
None
See application file for complete search history.

(56) References Cited

U.S. PATENT DOCUMENTS

| 3,598,171 A * | 8/1971 | Schulz | B22D 25/04 164/109 |
| 3,692,088 A * | 9/1972 | Kulig | B22D 17/14 164/62 |

(Continued)

FOREIGN PATENT DOCUMENTS

| DE | 102006004769 A1 | 8/2007 |
| DE | 102007023418 A1 | 11/2008 |

(Continued)

*Primary Examiner* — Monica A Huson
*Assistant Examiner* — Kelsey C Grace
(74) *Attorney, Agent, or Firm* — Laine IP Oy (57) ABSTRACT

The invention relates to a method for producing a material composite composed of metal and plastic to form a plastic-
(Continued)

metal hybrid component, in which method, to improve the adhesion of the metal surface and at least one plastic component, stochastically random macroscopic and/or microscopic undercuts are made by means of short-pulse laser radiation in the metal surface in order to roughen it, these undercuts each being filled at least partially with the at least one plastic component in an injection moulding process such that said plastic component engages into the macroscopic and/or microscopic undercuts, wherein, following the roughening of the metal surface and before and/or during the injection moulding process for the at least one plastic component, at least the roughened surface of the metal is heated to a temperature which, during processing, lies in the range of room temperature up to 100° C. above the processing temperature of the plastic.

26 Claims, 8 Drawing Sheets

(51) Int. Cl.
*B23K 26/352* (2014.01)
*B23K 26/00* (2014.01)
*B23K 26/082* (2014.01)
B23K 103/04 (2006.01)
B23K 103/10 (2006.01)
B29L 31/30 (2006.01)
B29K 705/00 (2006.01)
B29K 705/02 (2006.01)
B29K 705/12 (2006.01)

(52) U.S. Cl.
CPC .......... *B23K 26/082* (2015.10); *B23K 26/352* (2015.10); *B23K 26/355* (2018.08); *B23K 26/3584* (2018.08); *B29C 45/14778* (2013.01); *B23K 2103/04* (2018.08); *B23K 2103/10* (2018.08); *B29C 2045/14868* (2013.01); *B29C 2045/14893* (2013.01); *B29K 2705/00* (2013.01); *B29K 2705/02* (2013.01); *B29K 2705/12* (2013.01); *B29L 2031/30* (2013.01); *B29L 2031/3002* (2013.01)

(56) References Cited

U.S. PATENT DOCUMENTS

| | | | | |
|---|---|---|---|---|
| 3,841,867 A | * | 10/1974 | Davies | C21C 7/0006 420/86 |
| 3,928,684 A | * | 12/1975 | Buning | C08J 5/08 442/108 |
| 4,555,439 A | * | 11/1985 | Ueeda | C08K 3/34 264/319 |
| 4,861,407 A | * | 8/1989 | Volkmann | B29C 59/16 156/272.8 |
| 2004/0260166 A1 | * | 12/2004 | Merilainen | A61B 5/04085 600/383 |
| 2006/0008761 A1 | * | 1/2006 | Allred | A61C 7/16 433/9 |
| 2008/0070001 A1 | * | 3/2008 | Lasarov | B29C 45/1418 428/141 |
| 2011/0047799 A1 | * | 3/2011 | Abels | A61C 7/14 29/896.11 |
| 2012/0094108 A1 | | 4/2012 | Chang et al. | |

FOREIGN PATENT DOCUMENTS

| | | |
|---|---|---|
| DE | 102008040782 A1 | 2/2010 |
| DE | 102010055824 A1 | 6/2012 |
| DE | 102011010997 A1 | 8/2012 |
| DE | 102011100449 A1 | 10/2012 |
| DE | 102011111745 A1 | 2/2013 |
| JP | 2014051041 A | 3/2014 |

* cited by examiner

METHOD FOR PRODUCING A MATERIAL COMPOSITE COMPOSED OF METAL AND PLASTIC TO FORM A PLASTIC-METAL HYBRID COMPONENT

FIELD

The invention relates to a method for producing a material composite composed of metal and plastic to form a plastic-metal hybrid component.

BACKGROUND OF THE INVENTION

In one such method known from JP 2014-051041 A, in a first method step macroscopic and/or microscopic undercut slots are introduced by means of short-pulse laser radiation into the metal surface in order to roughen it to improve the adhesion of the metal surface and at least one plastic component, the concave-shaped opening region of which undercut slots in plan view and the longitudinal cross-section thereof being intended to have a repeating, geometrically precisely defined shape. Defined, constantly repeating shapes such as a circular shape, the shape of a leaf of a ginkgo tree, a boomerang shape, an elliptical shape, a square shape, a polygonal shape or suchlike are specified for the opening region of the slots to be introduced into the metal surface in its plan view and a triangular shape, a rectangular shape or a trapezium shape for the longitudinal cross-section of the slots. In a second method step, the slots thus precisely formed in the metal surface are then filled at least partially with the at least one plastic component, in such a way that improved adhesion is achieved between the latter and the slots in the metal surface.

A method for producing a composite body composed of at least one metal component to be prefabricated and at least one plastic component is also known from DE 10 2011 100 449.5 A1 wherein, for a surface of the metal component which is to be brought into contact with the plastic component and in which a toothing arrangement with a multiplicity of toothing elements arranged spaced apart from one another is to be impressed, the profile of the individual toothing elements of the toothing arrangement to be bent out of the surface of the metal component and/or their number and/or their distribution within the toothing arrangement and/or their position in space (x, y, z coordinates) and/or their area and/or their surface structure and/or surface roughness is determined by means of numeric simulation in a force flux-orientated manner according to the static and/or dynamic forces, calculated beforehand, that act on the composite body at each connection of the composite body to be produced in a form-fit manner, then the multiplicity of toothing elements of the toothing arrangement are impressed in the surface of the metal component, arranged and orientated spaced apart from one another in a profiled manner corresponding to the numeric simulation, after which each toothing element is bent around the bending edge out of the surface of the metal component into its force flux-orientated position in space predetermined by means of the numeric simulation, and the metal component is then connected in a form-fit manner to the plastic component to form the composite body. The metal component, from which the multiplicity of toothing elements of the toothing arrangement is bent out, is then fixed in an injection moulding tool and the plastic component of the composite body is injected in a standard injection moulding process onto the surface of the metal component from which the multiplicity of toothing elements is bent out, wherein each toothing element of the toothing arrangement is embedded in the plastic of the plastic component injected onto the metal component in its force flux-orientated position in space predetermined by means of the numeric simulation and is firmly anchored therein when the plastic of the plastic component solidifies.

DE 10 2007 023 418 B4 describes a method for roughening the surfaces of components, in particular of metal, plastic or ceramic, for the improved adhesion of thermally sprayed layers deposited thermally thereon, in that the surface is roughened thereby forming microscopic undercuts, wherein shaped pockets with angles of inclination in the range from 20° to 80° are introduced into the surface by means of pulsed laser beams, said shaped pockets being dimensioned such that at least one of the edges of the shaped pockets forms an undercut relative to the metal surface, wherein the surface is repeatedly treated with pulsed laser beams at least in sections, said laser beams having different directional angles, angles of inclination and/or different laser energies. It is described there as advantageous for the quality of the coating that the sprayed jet should be guided over the surface with the same inclination as the shaped pockets. For this purpose, the shaped pockets should be formed in the same direction in parallel with only one edge undercut relative to the surface. The deeper the shaped pockets, the more precise a matching, suitable angle of the sprayed jet must therefore be. The tolerances of the angular adjustment diminish correspondingly. A spray jet not suitably selected can therefore lead to incomplete filling of the shaped pockets, which has an adverse effect or reduces the bonding strength of the sprayed layer.

Furthermore, a method for roughening metal surfaces for improving the adhesion of layers thermally sprayed thereon emerges as being known from DE 10 2006 004 769 A1. Here, recesses or depressions are introduced into the surface in a metal-removing treatment in a first method step, so that the projecting metal of the surface forms raised microstructures, in particular projections, grooves, protuberances or dents, wherein these microstructures are reworked by forming and/or breaking in at least a second method step, in such a way that a substantial proportion of the structures constitutes undercuts relative to the surface.

A method for producing a component composite, in particular for automotive applications, is disclosed as known in DE 10 2008 040 782 A1, comprising at least a first component with a first contact surface and at least a second component with a second contact surface lying adjacent to the first contact surface, wherein a surface structure is generated by means of a laser on the first contact surface of the first component, in such a way that said surface structure comprises a microstructure superimposed by a nanostructure. After the surface structuring of the first contact surface of the first component, the latter is connected to the second component, which is constituted by plastic material, in particular by a thermoplastic material, by encapsulation of the first component with the second component in a form-fit manner at least in sections.

Furthermore, a control housing module made from a metal-plastic hybrid composite for an internal combustion engine emerges as known from DE 10 2011 111 745 A1, said control housing module comprising at least one metal insert, wherein the rib structure comprises injection-moulded reinforcing ribs made of a thermoplastic plastic, which comprises short fibres of a reinforcing material with a volume proportion of at least 305.

Finally, a method of producing a composite part is known from DE 10 2010 055 824 A1, said composite part being reinforced by a profile hollow body, wherein the following method steps are carried out:

1. Preparation of a profile body,
2. Introduction of the profile body into a cavity of an injection moulding tool,
3. Forming of the composite component by injection of plastic material into the cavity, wherein the profile hollow body is supported during the injection by a reinforcement medium in the internal volume of the profile hollow body,
4. Curing of the injected plastic material.

SUMMARY OF THE INVENTION

The present invention is based on a novel problem of providing a method of the type mentioned at the outset, with which a robust plastic-metal hybrid component with a high stability under load can be produced, which is extremely non-critical with regard to the surface purity of the metal before the processing and is stable with regard to loads due to temperature change and corrosion. In particular, it is to be ensured that, in order to optimise the bonding strength of the plastic-metal hybrid component to be jointed in the injection moulding of the at least one plastic component onto the roughened metal surface, premature setting of the former is prevented and maximum adhesion stability of the at least one plastic component on the structured metal surface is ensured.

According to the invention, the problem is solved by the entirety of the features of the method according to claim 1. Developments of the method according to the invention are described in the dependent claims.

According to the invention, to improve the adhesion of the metal surface and at least one plastic component, stochastically random macroscopic and/or microscopic undercuts are introduced by means of short-pulse laser radiation into the metal surface in order to roughen it, said undercuts each being filled at least partially with the at least one plastic component in an injection moulding process, such that said plastic component engages in the macroscopic and/or microscopic undercuts, wherein, following the roughening of the metal surface and before and/or during the injection moulding process for the at least one plastic component, at least the roughened surface of the metal is heated to a temperature which, during processing, lies in the range from room temperature up to 100° C. above the processing temperature of the at least one plastic component.

To generate the macroscopic undercuts of the metal surface by means of the short-pulse laser radiation, use is preferably made of a scanner with an adapted focal length of the scanner optics and a beam guide. The scanner and the metal surface to be roughened can be continuously moved at a predetermined speed relative to one another, wherein the movement of the scanner is superimposed with an axial movement of a robot or the axial system or a coordinate system of the object to be processed, so that the scanner optics guides the laser beam in a continuous loop over the metal surface in its working field and a uniform roughening (structuring) is generated with a continuous relative movement over the entire metal surface.

The temperature to which the roughened surface of the metal is heated preferably lies in the range from 100° C. below up to the processing temperature of the at least one plastic component.

The heating of the roughened metal surface of the metal can take place to a temperature which is higher than the glass transition temperature, preferably in the region of the latter in the case of thermoplastics.

The temperature to which at least the roughened metal surface of the metal is heated is preferably selected dependent on parameters such as process duration, viscosity of the melt and fineness and depth of the roughening (structuring) of the metal surface.

In a preferred embodiment of the method according to the invention, the heating of the metal can take place in an injection moulding tool, and preferably inductively. As a result of the inductive heating of the metal side of the material composite in the injection moulding tool, the temperature can be regulated very precisely and uniform heating of the metal side of the material composite can be achieved to ensure maximum processability.

The heating of the metal side of the material composite can however also take place outside the injection moulding tool, e.g. in a furnace, which in the method according to the invention enables the use of a much simpler injection moulding tool, provided that there is a temporally direct sequence of method steps. The use of a comparatively low-cost injection moulding tool is also possible in the case of heating the metal side of the material composite using temperature regulation in a targeted manner by means of water, oil or gas in an IHF (internal high-pressure forming) process.

The temperature of the metal side of the material composite to be obtained by variable temperature regulation is dependent on the properties of the selected plastic component. Thus, when use is made of thermosetting plastics for the plastic component, the heating at least of the roughened metal surface of the metal can preferably take place to a temperature which lies above the glass transition temperature of the plastic component and below the maximum of the processing temperature of the plastic component of the plastic-metal hybrid component during the injection moulding onto the roughened metal surface and which is selected depending on process parameters such as duration of the injection moulding, viscosity of the melt and fineness and depth of the roughening (structuring) of the metal surface. The decisive factor is that the undercuts of the roughened metal surface are at least partially filled with the plastic component.

As plastic components, use is made both of thermoplastically processable moulding compounds as well as subsequently setting moulding compounds such as thermosetting plastics and also multi-component systems, which can be modified with regard to their nature and composition, adapted to the requirements in the given area of application of the plastic-metal hybrid component produced according to the invention. A lower viscosity of a polymeric component or a corresponding resin system proves to be advantageous for filling the cavities of the structured metal surface.

Possible modifications of the composition of the polymer components include the chemical structure of the polymer molecules. Thermoplastic polymers such as polyamides, polyesters, polyacetals, polybutylene terephthalate and polyolefins such as polypropylene or polyethylene or mixtures thereof or polyamides such as polyamide 6 or polyamide 6.6 or polyphenylene oxide or polyether imide are preferably selected as thermoplastics. Partially crystalline polyamide 66 has proved to be advantageous on account of the combination of high heat distortion resistance and flowability.

Possible combinations of the composition of the plastic component also include both the area of fillers and reinforcing materials, in particular fibrous and platelet-like reinforcing materials, as well as the area of additional additives, in particular with regard to an adhesion modification of the plastic or at least of a plastic component on the structured metal surface.

In the area of fillers and reinforcing materials, components are particularly advantageous that reduce the length expansion coefficient of the plastic component and reduce stresses in the interface region of the material composite caused by a temperature change. Glass fibres, carbon fibres or aramide fibres are preferably used as fibres for reinforcing the at least one plastic component. Polymer-based reinforcing systems such aramide fibres, which have a negative thermal expansion coefficient along the fibre orientation, prove to be particularly advantageous in this connection.

In the method according to the invention, used may be made of plastic components without reinforcing fibres, with relatively short reinforcing fibres, for example with a fibre length of less than 1 mm, preferably less than 0.4 mm, or short glass fibres before the injection moulding process, and/or with relatively long reinforcing fibres, for example with a fibre length in the range 1-30 mm before the injection moulding process. Thermoplastics, thermosetting plastics and elastomeric plastics can be used here, wherein use is preferably made of technical plastics such as polypropylene or polyamide that are fibre-reinforced.

The filling of the cavities of the structuring of the metal surface during the injection moulding with fibre-reinforced plastic ensures a high load-bearing capacity of the material composite and, surprisingly, excellent engagement of the in particular glass fibre-reinforced plastic component in the macroscopic and/or microscopic undercuts of the roughened metal surface can be achieved. By means of a partially evacuated injection moulding tool, complete filling of the cavities of the structuring of the metal surface that are introduced into the metal surface can be achieved.

When steel is used as a metal and highly reinforced thermoplastic plastic as a plastic component, i.e. partially crystalline polyamide 66, the roughened steel surface is heated before the injection moulding process with the highly reinforced thermoplastic plastic to a temperature in the range from 100° C. below melt temperature up to melt temperature in processing.

Prior to the injection moulding, the at least one plastic component is preferably mixed with additives to increase its bonding strength to the roughened and heated metal surface.

The production of the material composite of the plastic-metal hybrid component is preferably simulated numerically depending on the process parameters, heating at least of the roughened surface of the metal to a temperature, process duration of the injection moulding, viscosity of the melt and fineness and depth of the roughening (structuring) of the metal surface.

If aluminium is used as a metal in the material composite and, after roughening of the aluminium surface, the aluminium component is formed under conditions of internal high pressure in a combined internal high-pressure injection moulding process with the at least one plastic component, the forming heat of the aluminium can be used for heating the roughened aluminium surface in the injection moulding process with the at least one plastic component.

The plastic-metal hybrid component producible according to the invention is preferably used as a structural component with a relatively high degree of lightweight construction in car manufacture or in the manufacture of other means of transport or for electronic devices.

The main advantages of the invention consist in the creation of a robust connection between plastic and metal with high stability under load, which is extremely non-critical with regard to the surface purity of the metal before the processing. The material composite proves to be extremely stable in thermal fatigue tests and corrosion tests.

As a result of inductive heating of the metal side of the material composite in the injection moulding tool, the heating temperature of the metal surface can be regulated very precisely and uniformly, as result of which a high level of process stability is ensured.

As a result of the heating of the metal side of the material composite outside the injection moulding tool, the latter can be implemented in a much simpler embodiment, provided that the method steps of the method according to the invention are implemented in a temporally close sequence.

Moreover, structures adapted in a targeted manner with a macroscopic roughening depth in the range from 100 μm to 1 mm are possible with stochastically random microscopic roughness shapes, as a result of which optimum engagement of plastic and metal is ensured in the subsequent injection moulding process.

In particular, the method according to the invention ensures that, for the optimisation of the bonding strength of the plastic-metal hybrid component to be jointed in the injection moulding process with at least one plastic component, premature setting of the latter is prevented, at least partial filling of the undercuts with excellent engagement of the at least one plastic component in the macroscopic and/or microscopic undercuts of the roughened metal surface is achieved and maximum bonding strength of the least one plastic component to the structured metal surface is ensured.

The method according to the invention ensures the production of a material composite composed of metal and plastic to form a plastic-metal hybrid component, which continues to have excellent durability of the connection in the presence of temperature change and/or after corrosion.

BRIEF DESCRIPTION OF THE DRAWINGS

The invention is now explained by reference to the figures of the drawings. In these figures.

DETAILED DESCRIPTION OF EMBODIMENTS OF THE INVENTION

Figure 1:
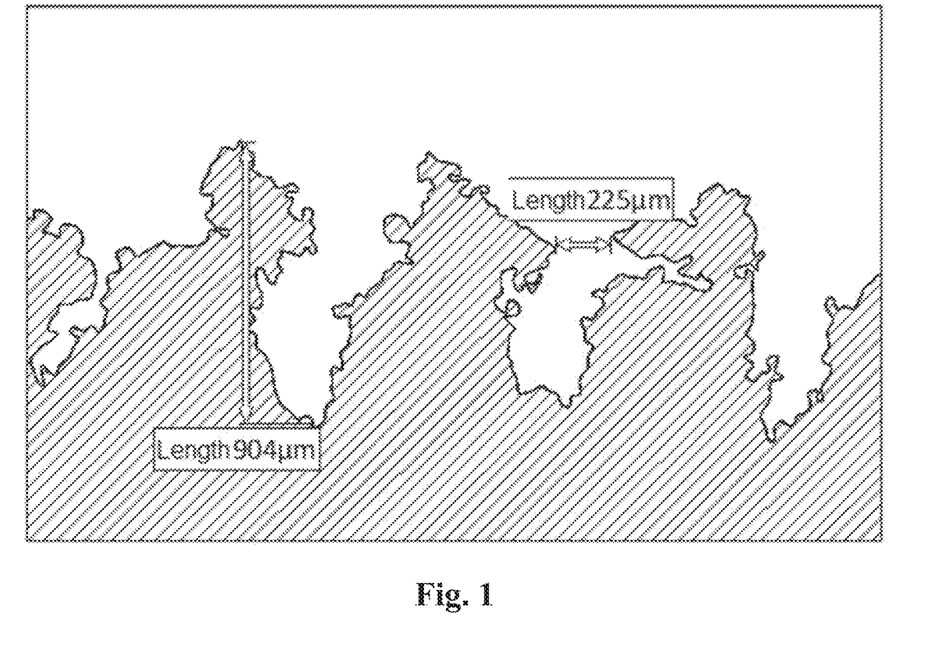
FIG. 1 shows a microscopic representation of a structuring of the metal surface of a first metal-polymer composite.
Figure 2:
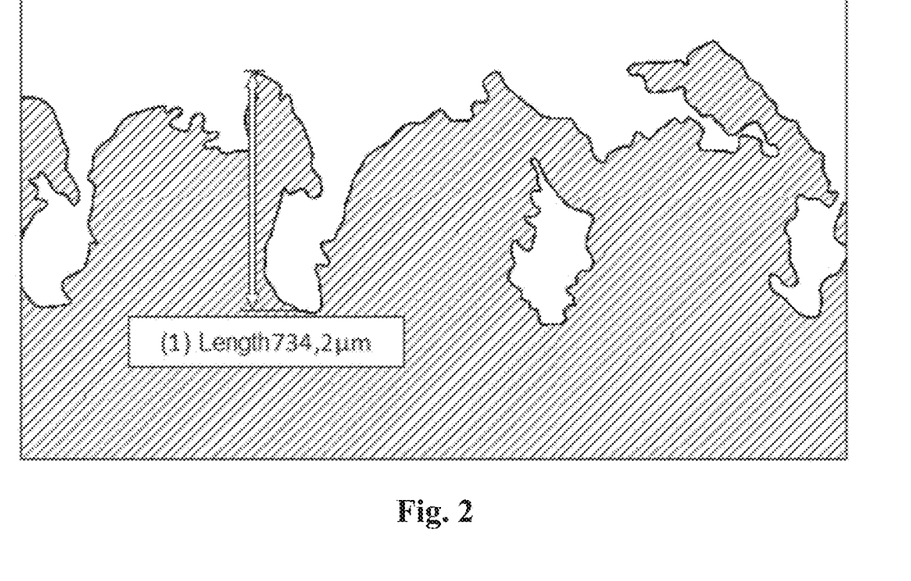
FIG. 2 shows a microscopic representation of a structuring of the metal surface of a second metal-polymer composite.
Figure 3:
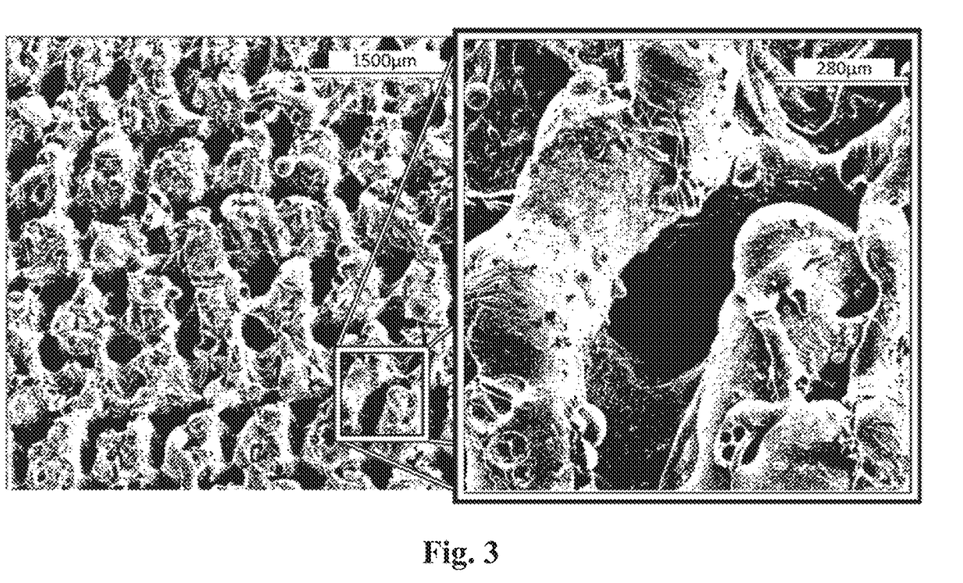
FIG. 3 shows a REM image of the structuring of the metal surface.

The invention is now explained by reference to the figures of the drawings. In the latter:

FIGS. 1 and 2 each show a microscopic representation of a laser structuring of the metal surface of a first and second metal-polymer composite to be produced in each case with varying spacings and depths of the laser structuring, which has been generated to prepare the jointing area of the respective metal-polymer composite. As a REM image according to FIG. 3 shows, the laser structuring is applied in a two-dimensionally extending manner onto metal surface 3 for its roughening, wherein the size of the area is dimensioned according to the forces to be transferred by the respective metal-polymer composite to be produced. The laser structuring takes place by means of short-pulse laser radiation, wherein—as can clearly be seen from FIGS. 1 to 3—stochastically random macroscopic and/or microscopic undercuts are introduced into the metal surface in order to roughen the metal surface. During the jointing of the metal-polymer composite in an injection moulding process, the macroscopic and/or microscopic undercuts are at least partially filled with the polymer component, in such a way that an engagement of the latter in the macroscopic and/or microscopic undercuts takes place for the marked improvement in adhesion of the metal surface and the polymer component.

Figure 4:
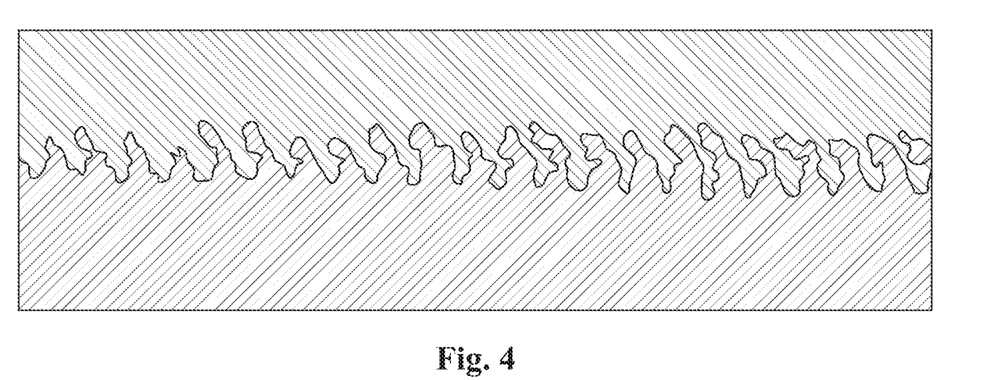
FIG. 4 shows a diagrammatic representation of a structuring of the metal surface of an aluminium/glass fibre-reinforced polymer composite.

A CT cross-sectional image of the jointing area of an aluminium/glass fibre-reinforced polyamide composite can be seen in FIG. 4, wherein the aluminium with the laser-structured surface and the undercuts and the glass fibre-reinforced polyamide material, with which the undercuts are filled, are represented above. Since the laser structuring of the aluminium surface cannot be fully ventilated during the injection moulding process, small unfilled residual parts remain (shown dark in the representation), which however can be avoided by the use of a partially evacuated injection moulding tool.

Figure 5:
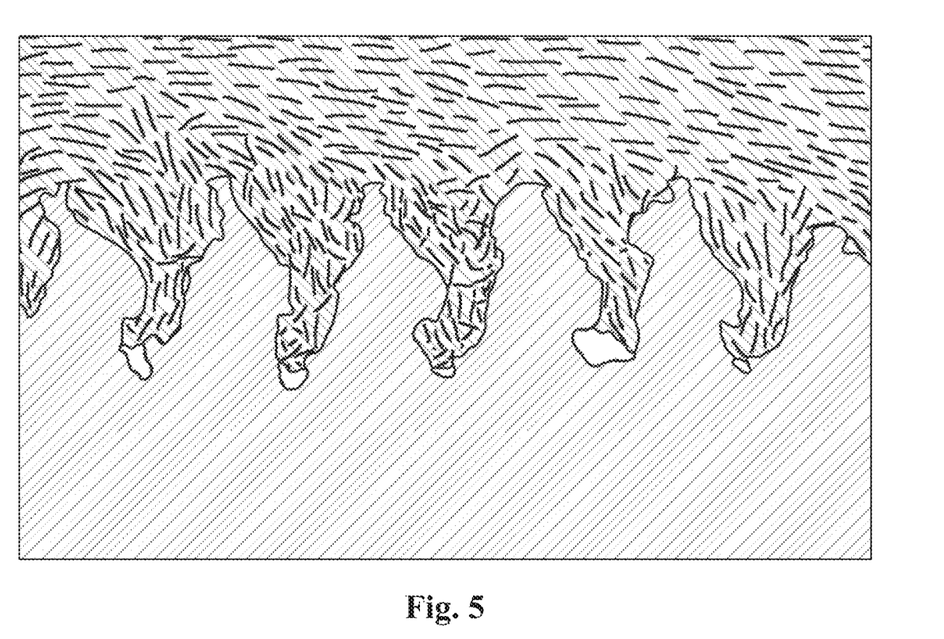
FIG. 5 shows a diagrammatic representation of a structuring of the metal surface of a metal/glass fibre-reinforced polyamide composite, wherein the unfilled regions are marked.

FIG. 5 shows a detail image of the jointing area of a steel/glass fibre-reinforced polyamide composite, wherein the metal is marked dark at the bottom, the polyamide medium grey at the top, the glass fibres in the latter in bright grey and the regions of the metal/glass fibre-reinforced polyamide composite not filled with glass fibre-reinforced polyamide in white. Here too, before the jointing of the metal/glass fibre-reinforced polyamide composite in the injection moulding process, stochastically random macroscopic and/or microscopic undercuts are introduced by means of short-pulse laser radiation into the metal surface in order to roughen it. In order to reinforce the polyamide, use may be made of short fibres with a length of 1-2 mm before the injection moulding process and/or long glass fibres with lengths up to 30 mm before the injection moulding process. With the aid of a partially evacuated injection moulding tool, complete filling of the laser structuring of the roughened metal surface with the glass fibre-reinforced polyamide can be achieved, so that a very high load-bearing capacity of the metal/glass fibre-reinforced polyamide composite is ensured.

Complete filling of the laser structuring of the roughened metal surface with the glass fibre-reinforced polyamide can be achieved with the aid of a partially evacuated injection moulding tool, so that a very high load-bearing capacity of the metal/glass fibre-reinforced polyamide composite is ensured.

Figure 6:
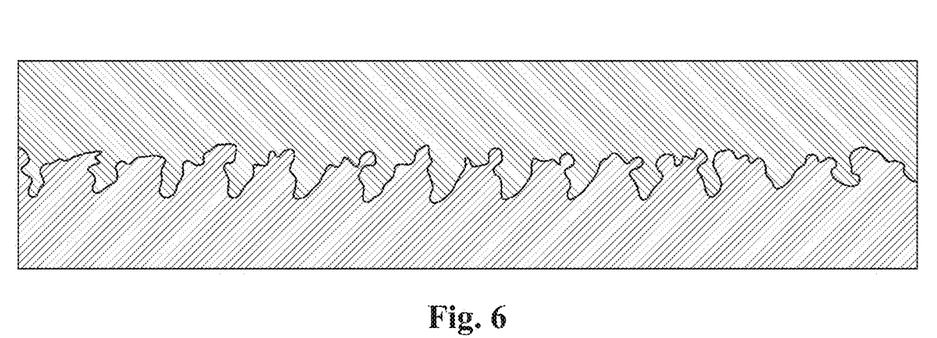
FIG. 6 shows a diagrammatic representation of a structuring of the metal surface of a steel/glass fibre-reinforced polyamide composite.

In a similar way, FIG. 6 shows a detail image of the jointing area of a steel/glass fibre-reinforced polyamide composite, wherein steel is shown below and the glass fibre-reinforced polyamide material above and the undercuts of the laser-structured steel surface filled by the latter are represented. For the filling of the undercuts and the cavities of the laser-structured steel surface in the injection moulding process, it is necessary to prevent premature setting of the plastic material, especially when use is made of highly viscous plastics. It is therefore necessary to heat, e.g. by induction, the steel surface roughened by means of short-pulse radiation before the jointing process or during the jointing process.

For example, a temperature of the steel of approx. 250° C. has been shown to be very well suited in a combination of steel with highly reinforced polyamide 66, wherein the temperature can lie approx. 50° lower or 30° C. higher depending on the type of the polyamide used, such as for example suitable for high temperatures, crash-resistant etc.

Figure 7:
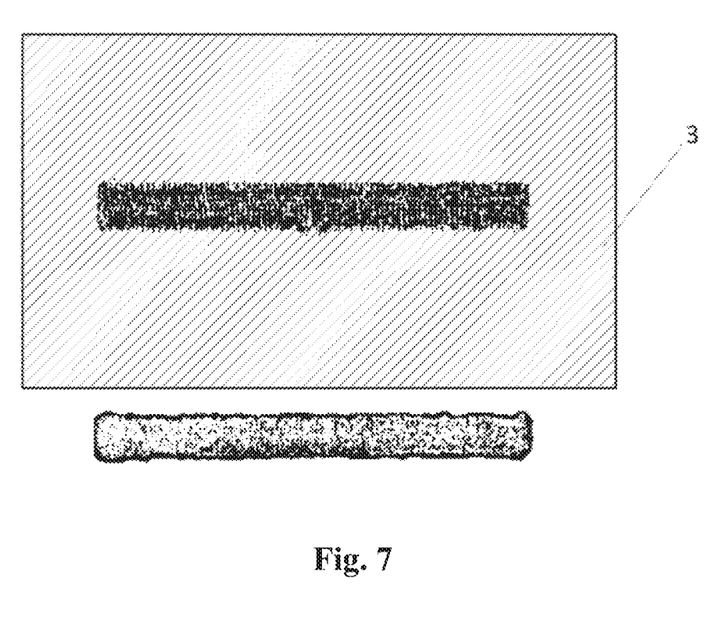
FIG. 7 shows an image of a test body of a plastic-aluminium hybrid component after a destructive test.

FIG. 7 shows a photographic image of a plastic-metal hybrid component as a test body after a destructive test, wherein the base width of 5 mm of the plastic component can be seen on a metal plate measuring 40 mm×70 mm. If, for example, an internal high-pressure formed aluminium component is to be connected to a plastic component, the forming heat of the aluminium can be used in an integrated jointing process, so that there is no need for additional heating thereof before the jointing.

In connection with the test body, it has been shown that the fillers and reinforcing materials of the plastic components used, which by their nature can penetrate into the cavities of the laser-structured metal surface, can contribute to an improved force transfer in the proximity of the interface of the composite.

In order to prevent corrosion of the jointing area of the plastic-metal hybrid component, a frame of elastomer material surrounding the jointing area can first be injected when use is made of a two-component injection moulding process, after which the thermoplastic or thermosetting plastic component is deposited directly onto the laser-structured metal surface of the jointing area, by means of which a composite stable under load is produced. Alternatively, the elastomer frame can also be deposited, following the production of the composite, around the latter by means of a suitable process such as for example injection moulding for the purpose of sealing.

Figure 8:
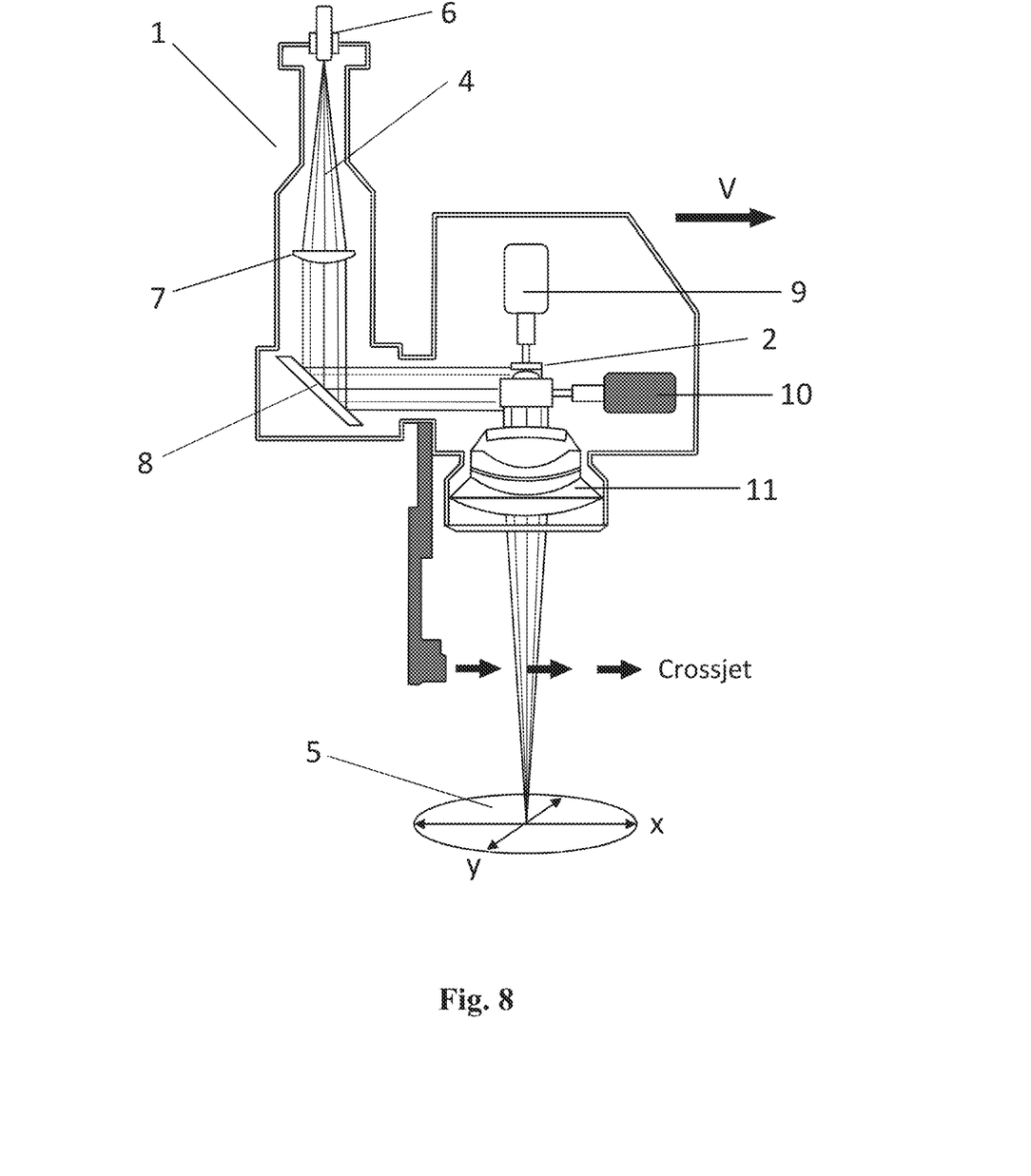
FIG. 8 shows a diagrammatic representation of the optics of a scanner during its movement.

A diagrammatic representation of the optics of a scanner during its movement emerges from FIG. 8, said scanner being used with an adapted focal length of the scanner optics and a beam guide for the stochastically random introduction of the macroscopic and/or microscopic undercuts in the metal surface for the roughening thereof by means of short-pulse laser radiation.

The mechanical structure of scanner optics 1 as such is known. According to the method according to the invention, scanner 2 is moved continuously at a predetermined speed (arrow v) relative to metal surface 3 to be roughened, wherein its movement is at the same time superimposed with an axial movement of a robot (not shown). Scanner optics 1 guides laser beam 4 in a continuous loop over the metal surface in its working field (x, y) 5, wherein a uniform stochastic roughening (structuring) is continuously generated with continuous relative movement on the entire metal surface to be structured.

As can be seen from FIG. 8, a laser beam 4 emitted from a laser light cable 6 of scanner optics 1 is guided via a collimator 7, the laser optics and a deflection mirror 8 disposed downstream of the latter in the beam direction to a galvanometer scanner system comprising an X-axis scanner 9 and a y-axis scanner 10 and is deflected from the latter via a plane field lens 11 disposed downstream in the beam guide onto the working field of the metal surface to be structured. When scanner optics 1 is installed on a robot arm, the jointing area to be roughened can be moved away with the aid of a spacing control.

Figure 9:
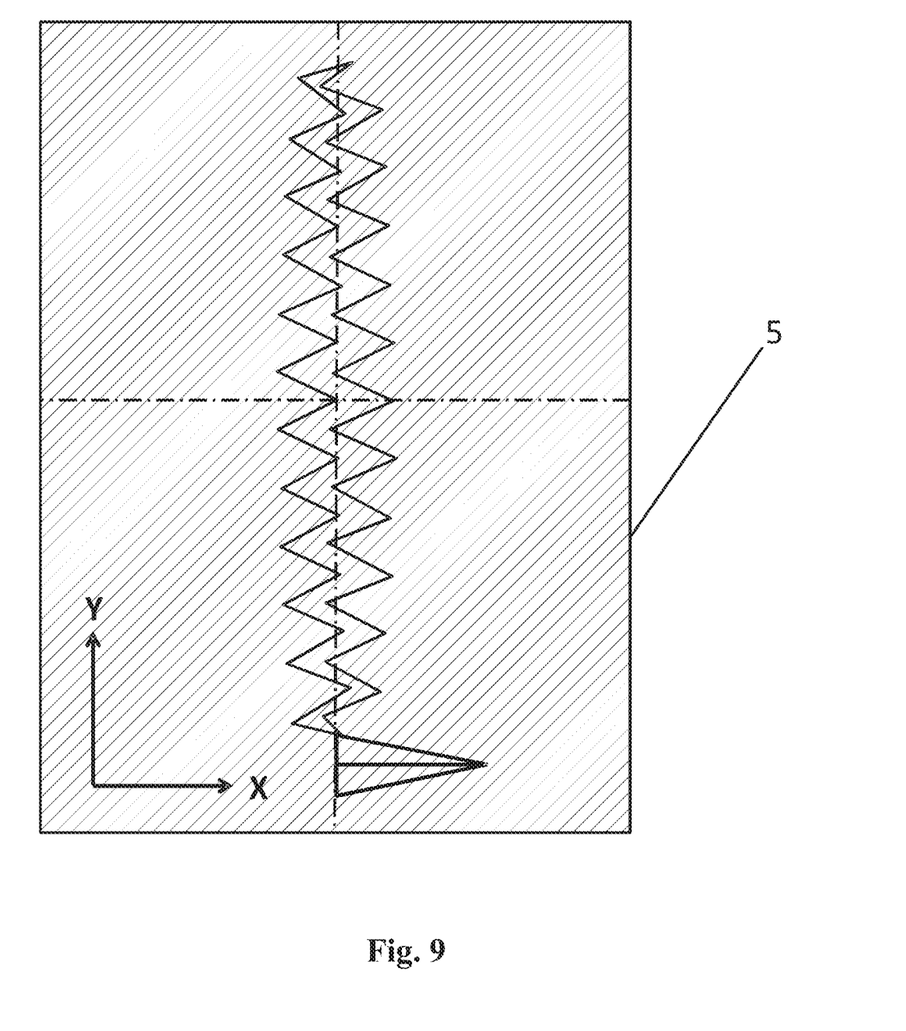
FIG. 9 shows a diagrammatic representation of the scanner movement in the working field.

FIG. 9 illustrates that the scanner optics performs a predetermined relative movement with respect to the workpiece surface to be structured, wherein, as emerges from FIG. 9, the scanner optics guides the laser beam in a continuous loop over a closed structure of the workpiece surface in its working field (x, y). By the superimposition of the two movements, targeted stochastic structural shapes of the metal surface to be structured, which are matched to the subsequent loading direction, can be generated with different depths. The shape and the depth of the generated laser structuring can be defined by changing the guidance (shape) and/or the speed of the beam movement and simultaneous adaptation of the laser parameters such as for example power and/or repetition rate. Depths of the structuring of several 100 μm up to 1 mm are possible. The adaptation of the injection moulding process to the nature of the jointing partner and the specified loading profile is thus possible.

Figure 10:
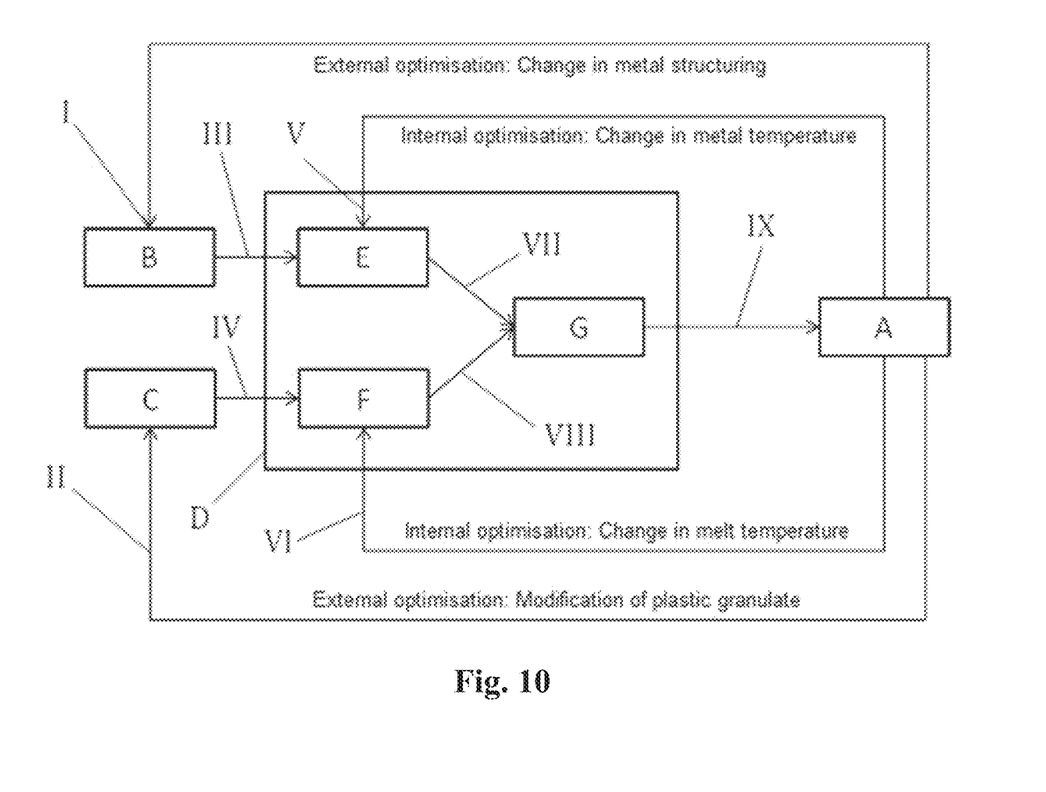
FIG. 10 shows a flow chart of an embodiment of the method according to the invention, from which the optimisation of the bonding strength of the plastic-metal hybrid component emerges.

FIG. 10 illustrates the possibilities of an optimisation of the bonding strength of a material composite composed of metal and plastic to be produced according to the invention to form a plastic-metal hybrid component. According to test specifications of a testing station (block A) of the material composite to be produced, a change in the metal structuring (block B) as well as a modification of the used plastic granulate (block C) of the respective corresponding jointing partner, metal or plastic component, is possible by means of a respective so-called external optimisation (directional arrow I and II). Furthermore, according to the test specifications of the material composite to be produced (block A), after introduction (directional arrow III) of the metal component with the laser-structured surface (block B) into an injection moulding tool (block D) for its heating (block E) inside the latter, and after introduction (directional arrow IV) of the plastic granulate (block C) into the injection moulding tool (block D) for the purpose of producing a melt (block F) of the plastic granulate before the jointing of the two jointing partners in an injection moulding process (block G), a change in the metal temperature (directional arrow V) or a change to the melt temperature (directional arrow VI) is possible by way of a respective internal corresponding optimisation, so that the injection moulding process (block G) is initiated after inputting optimised values from the heating of the metal component (directional arrow VII) and from the melt of the plastic component (directional arrow VIII) and the material composite is produced with an optimised bonding strength, said material composite being removed from the injection moulding tool (block D) and fed once again (directional arrow IX) to the testing station (block A).

LIST OF REFERENCES NUMBERS 1 scanner optics
2 scanner, galvanometer scanner
3 metal surface to be roughened
4 laser beam
5 working field of the scanner optics
6 laser light cable
7 collimator
8 deflection mirror
9 X-axis scanner
10 Y-axis scanner
11 plane field lens
v arrow for the speed of the scanner
Block A testing station of the workpiece composite to be produced
Block B change in the metal structuring
Block C change in the plastic granulate
Block D injection moulding tool
Block E heating
Block F melt
Block G injection moulding process
Arrow I external optimisation of the change in the metal structuring
Arrow II external optimisation of the change in the plastic granulate
Arrow III introduction of the metal component with a laser-structured surface into the injection moulding tool
Arrow IV introduction of the plastic granulate into the injection moulding tool
Arrow V change in the metal temperature
Arrow VI change in the melt temperature
Arrow VII internal optimisation of the heating of the metal component
Arrow VIII internal optimisation of the change in the melt temperature
Arrow IX feeding of the material composite to testing station A

The invention claimed is:

1. A method for producing a material composite composed of metal and plastic to form a plastic-metal hybrid component, wherein, to improve the adhesion of the metal surface and at least one plastic component, macroscopic undercuts with microscopic undercuts having stochastically random roughness shapes are introduced by means of short-pulse laser radiation into the metal surface in order to roughen it, said undercuts each being filled at least partially with the at least one plastic component in an injection moulding process, such that said plastic component engages in the random undercuts, wherein, following the roughening of the metal surface before and/or during the injection moulding process for the at least one plastic component, at least the roughened surface of the metal is heated to a temperature which, during processing, lies in the range from room temperature up to 100° C. above the processing temperature of the at least one plastic component, wherein the at least one plastic component is compounded with additives to increase its bonding strength to the roughened and heated metal surface.

2. The method according to claim 1, wherein the temperature to which the roughened surface of the metal is heated lies in the range from 100° C. below up to the processing temperature of the at least one plastic component.

3. The method according to claim 1, wherein the heating of the roughened metal surface of the metal takes place to a temperature which is higher than the glass transition temperature.

4. The method according to claim 1, wherein the temperature to which at least the roughened metal surface of the metal is heated is selected dependent on parameters such as process duration, viscosity of the melt and fineness and depth of the roughening of the metal surface.

5. The method according to claim 1, wherein, to generate the macroscopic undercuts of the metal surface by means of the short-pulse laser radiation, use is made of a scanner with an adapted focal length of the scanner optics and a beam guide.

6. The method according to claim 5, wherein the scanner is continuously moved at a predetermined speed relative to the metal surface to be roughened and its movement is superimposed with an axial movement of a robot, wherein the scanner optics at the same time guides the laser beam in a continuous loop over the metal surface in its working field and a uniform roughening (structuring) is generated continuously with a continuous relative movement on the entire metal surface.

7. The method according to claim 1, wherein the heating of the metal takes place inside the injection moulding tool.

8. The method according to claim 1, wherein the heating of the metal takes place outside the injection moulding tool in a furnace.

9. The method according to claim 1, wherein the heating of the metal takes place inductively.

10. The method according to claim 1, wherein the heating of the metal takes place by variable temperature regulation.

11. The method according to claim 1, wherein the heating of the metal takes place by means of water, oil or gas in an internal high-pressure forming process.

12. The method according to claim 1, wherein thermoplastics are used for the at least one plastic component.

13. The method according to claim 12, wherein thermoplastic polymers such as polyamides, polyesters, polyacetals, polybutylene terephthalate and polyolefins such as polypropylene or polyethylene or mixtures thereof or polyamides such as polyamide 6 or polyamide 6.6 or polyphenylene oxide or polyether imide are selected as thermoplastics.

14. The method according to claim 1, wherein thermosetting plastics are used for the at least one plastic component.

15. The method according to claim 1, wherein elastomers or elastomer-like plastics are used for the at least one plastic component.

16. The method according to claim 1, wherein the injection moulding process with the at least one plastic component takes place under an at least partial vacuum.

17. The method according to claim 1, wherein the at least one plastic component is compounded with fillers and reinforcing materials.

18. The method according to claim 17, wherein, as fillers and reinforcing materials, use is made of those that reduce the length expansion coefficient of the at least one plastic component.

19. The method according to claim 1, wherein glass fibres, carbon fibres, aramide fibres or natural fibres of flax, hemp or sisal are used as fibres for reinforcing the at least one plastic component.

20. The method according to claim 19, wherein fibres with a fibre length of less than 1 mm or less than 0.4 mm or short glass fibres are used.

21. The method according to claim 19, wherein fibres with a fibre length in the range from 1 mm to 30 mm or long glass fibres are used.

22. The method according to claim 19, wherein, as reinforcing materials, use is made of polymer-based reinforcing systems such aramide fibres, which have a negative thermal expansion coefficient along the fibre orientation.

23. The method according to claim 1, wherein, when use is made of steel, aluminium or other metals and highly reinforced thermoplastic plastic is used as a plastic component, the roughened steel surface is heated before the injection moulding process with the highly reinforced thermoplastic plastic to a temperature in the range from 100° C. below up to melt temperature in processing.

24. The method according to claim 1, wherein an aluminium workpiece is used as the metal of the material composite, wherein, after roughening of the aluminium surface, the aluminium workpiece is formed under conditions of internal high pressure into an aluminium component before the injection moulding with the at least one plastic component and the arising forming heat of the aluminium is used for heating the roughened aluminium surface for the injection moulding process with the at least one plastic component, said process taking place directly in the same tool.

25. The method according to claim 1, wherein the production of the material composite of the plastic-metal hybrid component is simulated numerically depending on the process parameters: heating at least of the roughened surface of the metal to a temperature, process duration of the injection moulding, temperature-dependent viscosity of the melt and fineness and depth of the roughening (structuring) of the metal surface.

26. A method for producing a material composite composed of metal and plastic to form a plastic-metal hybrid component, wherein, to improve the adhesion of the metal surface and at least one plastic component, stochastically random macroscopic and/or microscopic undercuts are introduced by means of short-pulse laser radiation into the metal surface in order to roughen it, said undercuts each being filled at least partially with the at least one plastic component in an injection moulding process, such that said plastic component engages in the macroscopic and/or microscopic undercuts, wherein, following the roughening of the metal surface before and/or during the injection moulding process for the at least one plastic component, at least the roughened surface of the metal is heated to a temperature which, during processing, lies in the range from room temperature up to 100° C. above the processing temperature of the at least one plastic component, wherein the at least one plastic component is compounded with additives to increase its bonding strength to the roughened and heated metal surface.

* * * * *